Dec. 6, 1927.
W. LA HODNY
MIRROR BRACKET
Filed May 18, 1925
1,651,896
2 Sheets-Sheet 2
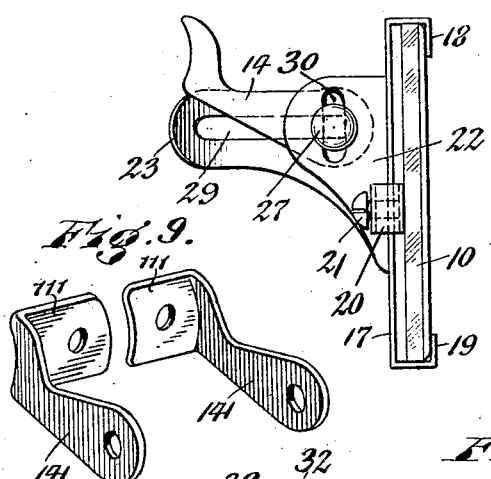
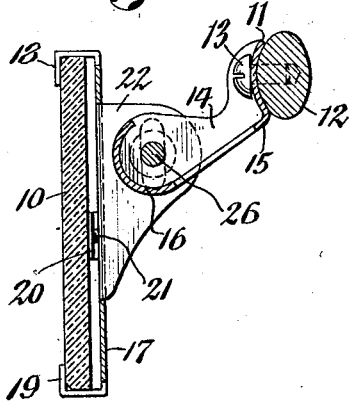
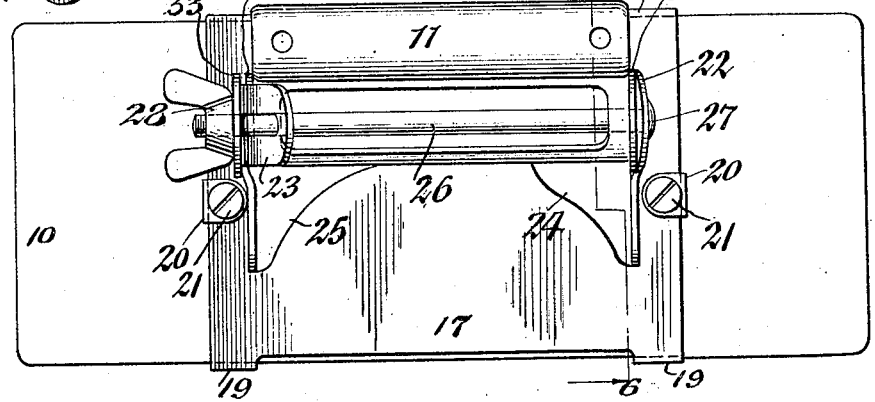
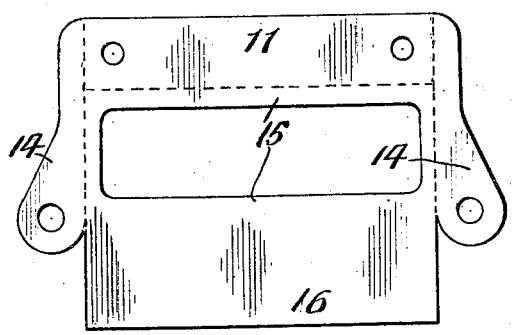
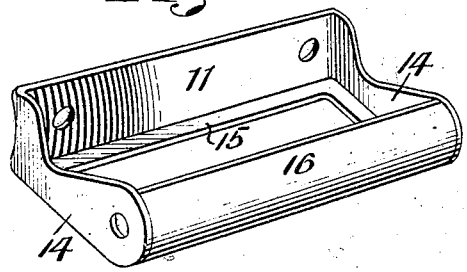
Inventor
William La Hodny
by Popp & Powers
Attys Patented Dec. 6, 1927.

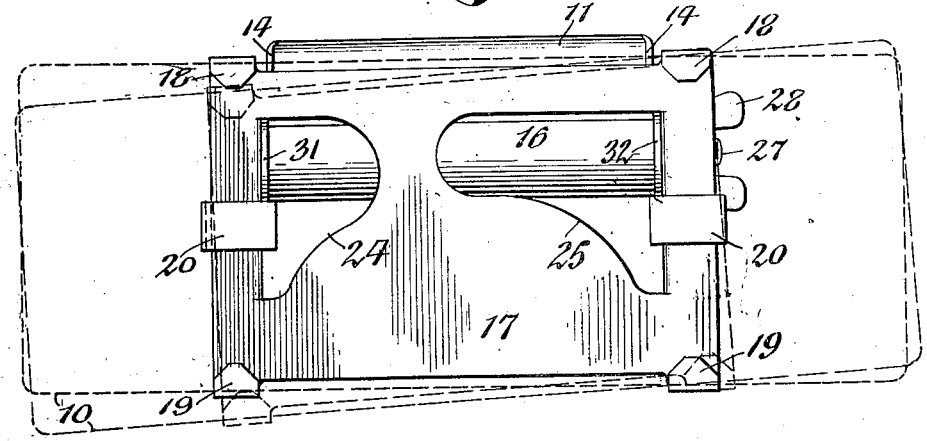
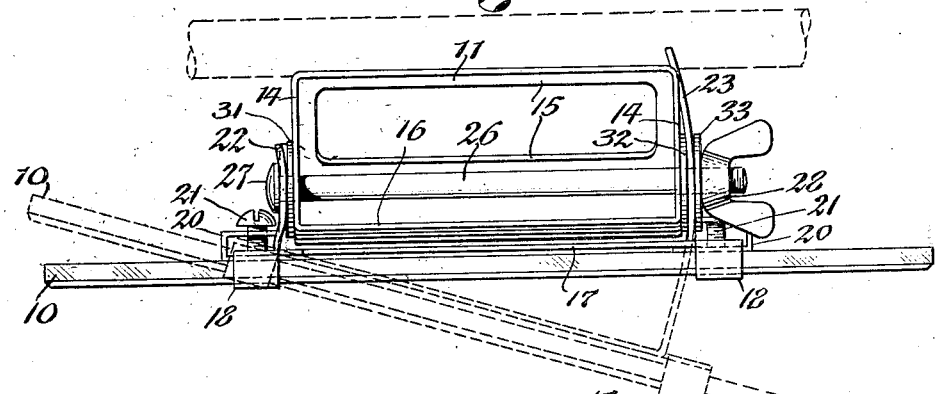
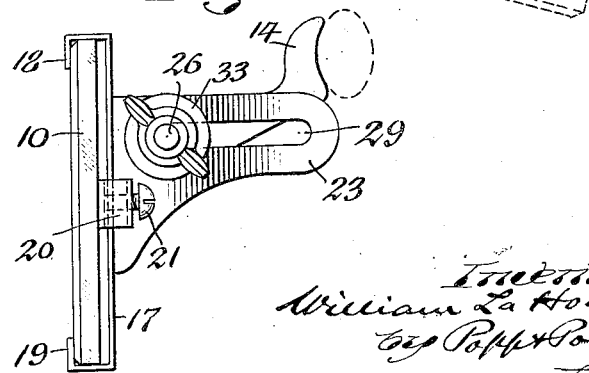

1,651,896

UNITED STATES PATENT OFFICE.

WILLIAM LA HODNY, OF BUFFALO, NEW YORK, ASSIGNOR TO STANDARD MIRROR COMPANY, INC., OF BUFFALO, NEW YORK, A CORPORATION OF NEW YORK.

MIRROR BRACKET.

Application filed May 18, 1925. Serial No. 30,919.

This invention relates to a bracket of that character which is adapted to support a rear view mirror on the windshield or other support of an automobile so as to permit of universally adjusting the mirror in any desired angle so that the driver be in the line of vision of the image which is reflected by the mirror.

It is the object of this invention to provide a bracket of this character which is strong and durable in construction, which can be manufactured at low cost and which will permit the mirror to be adjusted into any desired angle and after such adjustment hold the mirror reliably in position so that the same is not liable to become displaced due to vibrations of the car while the same is running.

In the accompanying drawings:
Figure 1, is a front elevation of a rear view mirror bracket embodying my invention.

Figure 2, is a top plan view of the same.

Figure 3, is an end elevation thereof viewed from one of its ends.
Figure 4, is a similar view viewed from the opposite end of the same.

Figure 5, is a rear elevation of the bracket and the mirror mounted thereon.

Figure 6, is a vertical section taken on line 6—6, Fig. 5.

Figure 7, is a plan view of the blank from which the hanger of the bracket is constructed.

Figure 8, is a perspective view of the finished hanger.

Figure 9 is a perspective view of a modified form of the hanger.

Similar characters of reference indicate like parts throughout the several views.
This bracket consists generally of two main elements, a hanger which is adapted to be mounted on the frame of the windshield or other available part of the automobile, and a head which is adapted to carry the mirror and which is mounted on the hanger in such a manner that the same is capable of being turned both vertically and horizontally and also in intermediate directions so that the mirror can be arranged in any desired angular position as best suits the desire or needs of the driver of the car and enable him to obtain a view of the roadway in rear of the car.

The numeral 10 represents the mirror which is preferably constructed of rectangular oblong form, as shown in the drawings but may be of any other suitable shape or outline if desired.

The hanger is preferably constructed from a single sheet of metal which is bent or stamped into shape so as to form a horizontal longitudinal cross bar 11 which is adapted to be secured to the upper windshield frame bar 12 or the frame of wood adjacent to it by means of screws 13 or other suitable means, two supporting arms 14, 14 projecting forwardly from opposite ends of the cross bar 11, a web 15 connected with the lower edges of the supporting arms and the lower edge of the cross bar 11, and a channel-shaped cross bar 16 which is formed at the front edge of the web by turning the latter upwardly on a curved line and engaging opposite ends of this channel with the opposing inner sides of the supporting arms at the front ends thereof.

By this means the channel 16 of the web forms a spacer between the supporting arms 14 which holds the latter in place against inward movement when the same are subjected to the pressure of the clamping means whereby the mirror supporting head is pivotally and adjustably mounted on the hanger as will presently appear.

The supporting head of the bracket comprises an upright plate 17 which is adapted to be arranged in rear of the mirror 10 and preferably constructed on a sheet of metal which is provided at its upper and lower edges with integral hooks 18, 19 which overhang the upper and lower edges of the mirror 10 for supporting the same. Various means may be provided for holding the mirror against displacement on the hooks and plate of the head, those which are shown in the drawings as an example for this purpose, consist of two U-shaped bearing members 20, each of which straddles the edge portion of the plate 17 and has one of its arms engaging with the rear side of the mirror 10 in front of the plate 17 and its other arm arranged in rear of this plate, and a clamping screw 21 passing through the rear leg of the bearing member and passing through an opening in the head plate 17 and engaging its front end with the rear side of the front leg of the bearing member 20, as shown in Figs. 1–6.

Within its marginal lines the supporting plate 17 has stamped therefrom two rearwardly projecting pivot lugs 22, 23 which are constructed integrally with this plate and form openings 24, 25 therein. These pivot lugs engage with the outer sides of the supporting arms 14, 14 of the hanger and are pivotally connected therewith by means of a clamping bolt 26 which passes horizontally through the companion pairs of rear supporting arms 14 and the front pivot lugs 22, 23. The head 27 at one end of this clamping and pivot bolt 26 engages the outer sides of one of the pivot lugs while the nut 28 which is preferably of the wing type bears against the outer side of the other pivot lug, as shown in Figs. 2–5. Upon tightening this clamping bolt the supporting arms 14, 14 are pressed tightly against opposite ends of the spacing member 16 and the pivot lugs 22, 23 are pressed firmly against the outer sides of the arms 14, 14 and thereby produce a frictional connection between the mirror supporting head and the hanger of the bracket which will reliably hold the mirror in whatever position the same may be adjusted and still permit the operator or driver to turn the head of the bracket vertically for the purpose of bringing the mirror in the proper position which will enable the driver to obtain a good view of the roadway in rear of the car and also permit the driver to turn the mirror upwardly into an inoperative position when it becomes necessary to prevent the lights from the rear cars striking the eyes of the driver at night time.

In order to permit of adjusting the mirror horizontally into the required angle which will permit the mirror to be mounted on the windshield or other support at one side of the driver's seat and still enable him to obtain a rear view, one of the pivot lugs, for instance the lug 22, in the present construction, is bent horizontally slightly into concavo convex form, as shown in Fig. 2 so as to permit the same to rock on the outer side of the companion pivot arm 14 for adjusting the mirror supporting head horizontally thereon, while the other pivot lug 23 is made longer than the pivot lug 22 and curved substantially concentric with the pivotal connection between the pivot lug 22 and the clamping bolt 26. The long pivot lug 23 is also provided with a horizontal slot 29 which receives the clamping bolt 26 and permits this last mentioned pivot lug to slide horizontally on this bolt for bringing the head of the bracket into different angular positions in a horizontal direction relatively to the hanger and thereby adjust the mirror into a position which best suits the requirements of the driver.

Inasmuch as it may be necessary at times to not only turn the mirror vertically and horizontally but also to tilt the same vertically, means are provided for accomplishing this purpose which in the present instance, consists in providing the short pivot lug 22 with a vertical slot 30 which receives the adjacent end of the clamping bolt 26, as best shown in Fig. 4. When the clamping bolt is loose, that end of the same which is mounted in the pivot lug 22 may be raised or lowered in the slot 20 and thereby tilt the bracket head bodily vertically together with the mirror mounted thereon so that the latter by the combined effect of this adjustment together with the horizontally swinging motion and the vertically rotary motion about the axis of the bolt 26 is capable of practically universal adjustment into any angular position which circumstances may require. After such adjustment the clamping bolt 26 may be again tightened so as to produce a frictional connection between the head and hanger of the bracket which will hold the parts reliably against displacement when subject to the vibration of the car, but will leave the same sufficiently loose to permit the attendant to swing the mirror vertically into or out of its operative position by the use of one hand and thereby leave the other hand free for controlling the car and thereby avoid possibility of accidents.

The capacity of thus maintaining a strong frictional connection for this purpose between the head and hanger of the bracket is due to the employment of the spacer 18 which is formed integrally with the hanger and is interposed between the front ends of the pivot or supporting arms 14, 14 whereby the co-operating pairs of the pivot lugs and arms are reliably supported and held against inward displacement when subjected to the clamping pressure of the bolt 26. The means whereby this is accomplished are very simple and durable as well as light and neat in appearance and the same can also be produced without any considerable increase in the cost of manufacture. In the preferred construction a fibrous washer 31 is preferably interposed between the short pivot lug 22 and the adjacent pivot arm 14, a fibrous washer 32 is interposed between the long pivot lug 23 and the adjacent pivot arm 14 and a fibrous washer 33 is interposed between the outer side of the long pivot arm 23 and the clamping nut 28, as best shown in Fig. 2. That end of the clamping bolt 26 which slides in the slot 30 is also preferably made square so that two of its flat facets engage with the parallel sides of this slot, as shown by dotted lines in Fig. 4, and thereby prevents this bolt from turning in this slot so that the tightening and clamping action of this bolt by means of its screw nut may be accomplished more reliably.

If desired the hanger may be made in two parts, as shown in Figure 9, each part consisting of a rear longitudinal bar or base 111 adapted to be secured to the windshield or canopy and an arm 141 projecting forwardly from the outer end of the base 111 and adapted to support one end of the clamping bolt 26.

I claim as my invention:—

A mirror bracket comprising a hanger adapted to be mounted on a support, and a head adapted to be attached to a mirror, said head including a plate adapted to be arranged in rear of the mirror and pivot lugs projecting rearwardly from said plate, said hanger including a cross bar adapted to be mounted on a support, pivot arms projecting forwardly from opposite ends of said bar and a web projecting forwardly from the lower edge of said cross bar and engaging with the inner sides of said arms and having its front edge curved to form a channel, and a pivot bolt connecting said lugs and arms and arranged opposite the channel of said web.

WILLIAM LA HODNY.